United States Patent [19]

Davis, Jr.

[11] 4,038,428

[45] July 26, 1977

[54] METHOD OF PACKAGING PIECRUST DOUGH

[76] Inventor: George B. Davis, Jr., 7512 Marbury Road, Bethesda, Md. 20034

[21] Appl. No.: 643,483

[22] Filed: Dec. 22, 1975

Related U.S. Application Data

[63] Continuation-in-part of Ser. No. 498,575, Aug. 19, 1974, abandoned, which is a continuation-in-part of Ser. No. 404,869, Oct. 10, 1973, abandoned, which is a continuation-in-part of Ser. No. 307,535, Oct. 17, 1972, Pat. No. 3,819,316.

[51] Int. Cl.² .............................................. B65B 55/00
[52] U.S. Cl. .................................... 426/394; 53/21 R; 426/128; 426/410; 426/411; 426/414
[58] Field of Search ............... 426/390, 391, 392, 394, 426/410, 411, 413–415, 496, 502, 512, 108, 128, 517; 53/3, 13, 21 R, 29; 229/DIG. 14

[56] References Cited

U.S. PATENT DOCUMENTS

| 2,298,545 | 10/1942 | Waters | 426/108 X |
| 2,699,738 | 1/1955 | Brittain | 426/496 X |
| 2,814,382 | 11/1957 | Lassiter | 53/21 R X |
| 3,625,348 | 12/1971 | Titchenal | 426/415 X |
| 3,819,316 | 6/1974 | Davis, Jr. | 426/128 X |

*Primary Examiner*—Frank W. Lutter
*Assistant Examiner*—William A. Cuchlinski, Jr.

[57] ABSTRACT

This invention relates to a method of packaging prepared piecrust dough that may be required to remain within its package for relatively long periods of time and within which thereafter the dough may be rolled into piecrust form while still in its packaging receptacle.

55 Claims, 7 Drawing Figures

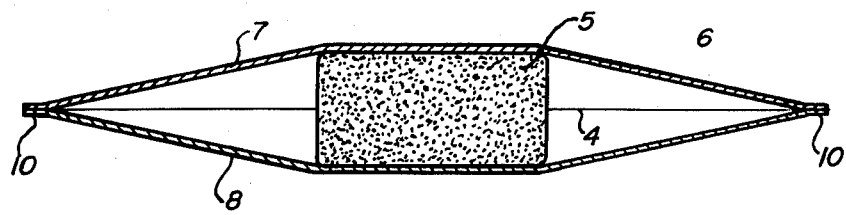
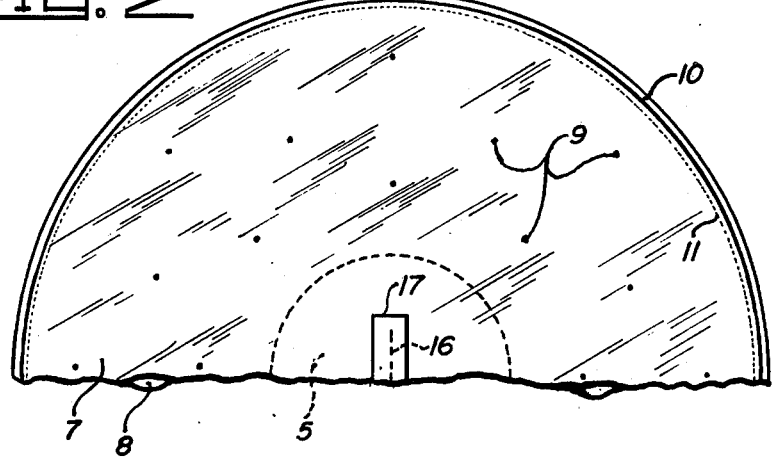
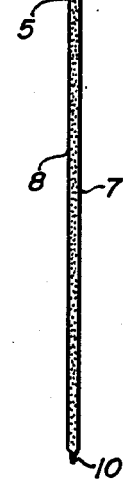
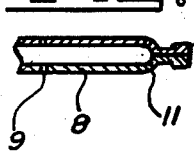
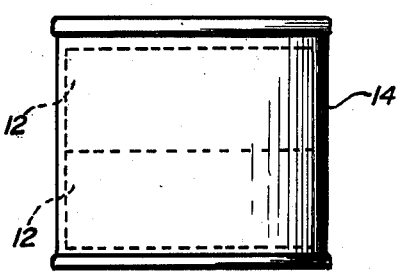
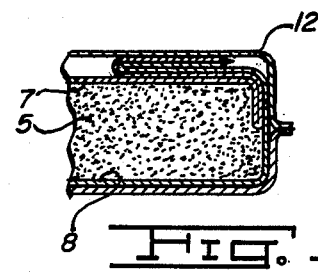

METHOD OF PACKAGING PIECRUST DOUGH

This application is a continuation in part of now pending application 498,575 filed 8-19-74 now abandoned, which was a continuation in part of application 404,869 filed 10-10-73 now abandoned which was a continuation in part of application 307,535 10-17-72 now issued U.S. Pat. No. 3,819,316.

When packaging prepared piecrust dough that is of the consistency suitable for shaping into piecrust form by rolling, it is highly desirable that the dough be compacted into its smallest practical mass and so inclosed that the least surface of the dough is exposed to air or to the material of the packaging container. Not only does such a compacted dough mass offer the advantages of being easily handled, stored, and shipped, but after rolling retains more of the texture of freshly prepared dough.

In order to provide that the package inclosing the dough mass further serves as a dough forming receptacle and wherein the dough mass may remain and be rolled into piecrust form, it is also highly desirable that the package be so constructed or assembled about the dough mass that the sealed edges of the receptacle lie within a plane extending substantially centrally through the dough mass to assure that the sides of the receptacle are symmetrical in size thusly assuring that the dough within the receptacle will roll out easily into crust form without wrinkles or irregularities in its surface or configuration.

It is an object of the present invention to provide a method for packaging prepared piecrust dough whereby the dough, still in the packaging receptacle may be rolled into piecrust form.

Another object is to provide a method for packaging piecrust dough whereby the dough within the package will remain in such a ductile and pliable state that when rolled, the dough will assume the configuration of the forming receptacle and retain substantially all the quality of freshly prepared dough.

A further object is to provide a method for packaging piecrust dough wherein after the pastry mass has been rolled into piecrust form within the packaging receptacle the sealed edge of the dough retaining receptacle may be torn free to separate and thereby open the receptacle for removing the rolled crust.

A still further object is to provide a method for packaging piecrust dough wherein the dough may be compacted into its smallest practical mass for shipment, storage, and handling, yet by reason of the package structure be readily extended to be rolled into crust form while still contained within its packaging receptacle.

To more fully understand the merits and advantages of the method of packaging piecrust dough described herein, reference is now directed to the description as viewed in the light of the accompanying drawing wherein:

FIG. 1 is a view in cross section through the receptacle of the package and inclosed dough mass therein before removal of the air from within the receptacle.

FIG. 2 is a sectional plan view of the receptacle and showing the arrangement of the air venting ports or punctures therein.

FIG. 3 is a view in cross section through the receptacle containing the dough mass with the edges of the receptacle extended before rolling the dough mass into piecrust form.

FIG. 4 is a view in cross section of the receptacle of FIG. 3 as with the dough mass therein rolled into piecrust form.

FIG. 5 is a fragmentary cross sectional view of the dough mass and retaining receptacle therefor as compacted within a closely fitting container therefor.

FIG. 6 is a view in elevation of the external container wherein is shown two of the packages of FIG. 5 stored therein for handling, shipping, and distributing.

FIG. 7 is a fragmentary view in cross section through an alternate peripheral seal wherein the material extending outwardly from the seal is removed beyond the seal after or concurrently with the sealing operation.

Referring now to FIG. 1 wherein is shown in cross section a prepared mass of pastry dough 5 such as used for the forming of piecrust or the like and about which is extended an inclosing receptacle 6. The receptacle 6 is constructed of thinly formed sheets 7 & 8 of preferably transparent heat sealable plastic that are suitably secured about their periphery as at 10 to inclose the dough mass 5. When forming the receptable 6, it is highly desirable that sheets 7 & 8 be extended tightly and uniformly outwardly from the dough mass and with the sheets then being brought together and secured together along a plane extending substantially centrally through the dough mass as shown by the seal line 4 thusly forming an inclosure about the dough mass having sides of substantially the same size and configuration thereby assuring that the dough therein will roll out evenly and smoothly into piecrust form without wrinkles or irregularities in shape or thickness.

Extending through the sheets 7 & 8 are a plurality of air venting ports or punctures 9, FIG. 2, which allows the air to be removed from the receptacle during the packaging process and which allows air to enter the receptacle as the edges of the receptacle are extended prior to the rolling operation. These punctures may extend in any manner or arrangement into the receptacle the requirement being that they remain sufficiently small as to allow the passage of air from and into the receptacle without allowing the viscus dough material extruding from the receptacle through these openings during the rolling operation and during such time relatively high pressures are applied to the dough within the receptacle.

These air venting ports 9 could be in the form of a line of closely spaced punctures 11 extending about the outer periphery of the receptacle and in close spaced adjacency to the seal edge thereof thereby to sufficiently weaken the receptacle at the punctures as to allow the sealed edge of the receptacle being torn free to open the receptacle upon completion of the rolling operation. Since the rolling pressure upon the dough is the greatest along the edge of the receptacle, these separating punctures must be very small and properly spaced as to prevent rapture of the form from internal pressure as applied from the rolled dough.

FIG. 3 is a cross sectional view through the receptacle and dough mass after removal of the air therefrom and which operates as shown to bring the inner surfaces of the extending edges of the receptacle together and closely about the dough mass. The air within the receptacle may be removed in any suitable manner as by pressing the air from the receptacle by way of venting ports 9 or by reducing the atmospheric pressure about the outer surface of the receptacle sufficiently as to collapse the receptacle closely about the dough mass as illustrated in FIG. 3. With the air removed from the receptacle the extending edges of the receptacle may be then folded, as in FIG. 5, about the dough mass or otherwise compacted for inclosing within a closely fitting container such as 12 or as shown by a container such as in FIG. 6.

If desired, a dough mass sufficient for the forming of a single piecrust such as in FIG. 5 may then be inclosed within a second closely fitting container such as 14, FIG. 6, for handling and shipment.

While the container 14 is herein shown as including two packets of piecrust dough for making a two crust pie, the individual packaging structure of each dough mass, such as shown in FIG. 5, is of such a nature as to maintain the freshness of the dough even if the outer container 14 is opened and only one dough packet is removed as for making a single crust pie. The remaining packet can be stored while refrigerated and will thusly retain its freshness for relatively long periods of time.

While as in FIG. 1 is shown the dough mass 5 as centrally positioned within a receptacle that has been constructed about the dough mass, it may be desired to first seal closed the receptacle while leaving therein a dough admitting opening or port 16 through which the dough may be subsequently admitted or by puncturing a sheet of the receptacle and the dough extruded between the sheets of the receptacle. It is preferable in either instance that the dough admitting port into the receptacle be subsequently closed as by a strip or patch of adhesive tape such as 17. Such a receptacle must include the necessary air venting ports 9 through which the air within the receptacle is removed and the receptacle compacted and packaged as hereinbefore described.

When packaging piecrust dough of this nature, the dough mass should never extend to the sealed edge of the receptacle. It is imperative that the dough receive some degree of "working" as by rolling into final piecrust form in order to maintain the desired pliability and texture of freshly prepared dough.

While herein is shown and described a method of packaging prepared piecrust dough that is to be subsequently rolled into piecrust form while still contained within its packaging receptacle, it is understood that the order of effecting certain of the steps of the method may be varied without departing from the packaging method prescribed.

What I therefor claim and desire to cover by letters patent is:

1. The method of packaging a prepared dough mass that is to be subsequently reshaped by rolling within its packaging receptacle into crust form, including the steps of depositing the prepared dough mass between two thinly formed sheets of flexible material within which at least one of the sheets includes a plurality of air venting ports sufficiently small as to allow the passage of air into and from the receptacle without allowing the viscus dough material extruding excessively from the receptacle through these ports during a normal dough rolling operation and during such time as relatively high pressures are applied to the dough within the receptacle, extending the sheets outwardly from the dough mass to bring the sheets together, securing the sheets together in spaced relation to the dough mass and along a plane extending substantially through the center of the dough mass to form a receptacle about said dough mass, removing substantially all air from within the receptacle to bring the inner surfaces of the receptacle together and closely about the dough mass, inclosing the assembled dough mass and receptacle within a closable container.

2. The method of packaging a prepared dough mass as set forth in claim 1 wherein the said air venting ports are formed within at least one sheet of the receptacle substantially contemporaneously with the step of securing the sheets of the receptacle together.

3. The method for packaging a prepared dough mass as set forth in claim 1 which further includes the step of extending through both sheets of the receptacle a plurality of air venting ports disposed in close internal adjacency to the secured together surfaces of said sheets.

4. The method of packaging a prepared dough mass as set forth in claim 1 which further includes the step of sealing closed the said closable container inclosing the dough mass and receptacle.

5. The method of packaging a prepared dough mass as set forth in claim 4 which further includes inclosing the said sealed container within a closable container.

6. The method of packaging a prepared dough mass that is to be subsequently rolled into crust form including the steps of securing thinly formed sheets of transparent flexible material together to define by their secured surfaces the configuration of a substantially circular wafer-like receptacle, incising into the receptacle a dough admitting port, depositing between the sheets of the receptacle by way of said port a prepared dough mass significantly smaller in diameter than said receptacle, removing substantially all air from within the receptacle to bring the inner surfaces of the receptacle together and closely about the dough mass, inclosing the assembly within a closable container.

7. A method of packaging a prepared dough mass as set forth in claim 6 which includes the step of forming within at least one sheet of the thinly formed flexible material at least one air venting port before the step of securing the sheets together.

8. The method of packaging a prepared dough mass as set forth in claim 6 which includes the step of, sealing closed the said dough admitting port.

9. The method of packaging a prepared dough mass as set forth in claim 6 which includes the step of forming in close inner adjacency to said sealed edge of said receptacle a plurality of closely spaced punctures that extend through both sheets of the receptacle.

10. The method of packaging a prepared dough mass as set forth in claim 6 which further includes the step of sealing closed the said closable container inclosing the dough mass and receptacle therefor.

11. The method of packaging a prepared dough mass as set forth in claim 10 which further includes the step of inclosing the said sealed container within a closely fitting closable container.

12. The method of packaging a prepared dough mass that is subsequently to be reshaped by rolling within its packaging receptacle into thin pastry form, including the steps of positioning the dough mass to be packaged between two thinly formed sheets of flexible material of which one sheet is transparent and wherein within at least one sheet has been formed a plurality of air venting pots sufficiently small as to allow the passage of air into and from the receptacle without allowing the viscus dough material extruding excessively from the receptacle through these ports during a normal dough rolling operation and during such time as relatively high pressures are applied to the dough within the receptacle, securing the sheets together to form a substantially circular receptacle about the dough mass with the secured edge of the receptacle being significantly larger in diameter than the dough mass, removing substantially all air from within the receptacle to bring the inner surfaces of the receptacle together and closely about the dough mass, compacting the assembly within a closely fitting container.

13. A method of packaging a prepared dough mass as set forth in claim 12 wherein the ports within at least one sheet of the material forming the receptacle are formed therein substantially contemporaneously with the step of securing of the sheets together.

14. The method of packaging a prepared dough mass as set forth in claim 12 which includes the step of extending through both sheets of the receptacle a plurality of closely spaced ports in close internal adjacency to the secured together edge of the receptacle.

15. The method of packaging a prepared dough mass as set forth in claim 14 wherein the step of extending through both sheets of the receptacle a plurality of closely spaced ports is affected prior to the step of securing the sheets of the receptacle together.

16. The method of packaging a prepared dough mass as set forth in claim 12 which further includes the step of sealing closed the said closely fitting container.

17. The method of packaging a prepared dough mass as set forth in claim 16 which further includes the step of inclosing the said sealed closed container within a closable container.

18. The method of packaging a prepared dough mass that is subsequently to be reshaped by rolling within its packaging receptacle into piecrust form including the steps of placing the prepared dough mass to be packaged upon a thinly formed sheet of flexible material, extending over the dough mass a second thinly formed sheet of flexible material with at least one of said sheets being transparent, extending the sheets outwardly from the dough mass and securing the sheets together in spaced relation to the dough mass in a manner to form by said secured surfaces of said sheets the edge of a substantially circular receptacle inclosing said dough mass and of which the sides of the receptacle are substantially the same size and configuration and from the interior of the receptacle extends at least one air venting port sufficiently small as to allow the poassage of air into and from the receptacle without allowing the viscus dough material extruding excessively from the receptacle through the port during a normal dough rolling operation and during such time as relatively high pressures are applied to the dough within the receptacle, removing substantially all air from within the receptacle to bring the inner surfaces of the receptacle together and tightly about the said dough mass, compacting the assembled dough mass and receptacle and inclose within a closely fitting container.

19. The method of packaging a prepared dough mass as set forth in claim 18 which includes the step of extending through at least one sheet of the receptacle a plurality of air venting ports.

20. The method of packaging a prepared mass dough as set forth in claim 18 wherein the step of puncturing at least one sheet of the receptacle is provided contemporaneously with the step of securing the sheets of the receptacle together.

21. The method of packaging a prepared dough mass as set forth in claim 18 which includes the step of extending through both sheets of the receptacle in close inner adjacency to the said secured together edge of the receptacle a plurality of closely spaced air venting ports.

22. The method of packaging a prepared dough mass as set forth in claim 18 which further includes the step of sealing closed the said closely fitting container.

23. The method of packaging prepared dough mass as in claim 22 which further includes the additional step of inclosing the said sealed container within a closable container.

24. The method of packaging a prepared dough mass wherein the dough mass wherein the dough mass is to be subsequently reshaped by rolling into crust form within the package including the steps of, positioning the dough mass between two thinly formed sheets of flexible material at least one of which is transparent, extending the sheets outwardly from the dough mass and secure the sheets together in spaced relation to the dough mass along a plane extending substantially through the center of the dough mass to form a receptacle inclosing the said dough mass, forming within said receptacle at least one air venting port sufficiently small as to allow the passage of air into and from the receptacle without allowing the viscus dough material extruding excessively from the receptacle through the port during a normal dough rolling operation and during such time as relatively high pressures are applied to the dough within the receptacle removing substantially all air from within said receptacle to bring the inner surfaces of the receptacle together and closely about the said dough mass, inclosing the dough mass and receptacle within an inclosing container.

25. The method of packaging a prepared dough mass as set forth in claim 24 including the steps of sealing closed the said inclosing container.

26. The method of packaging a prepared dough mass as set forth in claim 25 including the additional step of inclosing the said sealed container within a closely fitting closable container.

27. The method of packaging a prepared dough mass as in claim 24 which includes the step of forming at least one air venting port within the receptacle substantially contemporaneously with the step of securing the sheets of the receptacle together.

28. The method of packaging a prepared dough mass as set forth in claim 24 which further includes the step of extending through both sheets of the receptacle a plurality of closely spaced ports disposed in close internal adjacency to the secured together surfaces of said sheets.

29. The method of packaging a prepared dough mass wherein the dough mass is subsequently to be reshaped by rolling within its package into crust form including, the steps of positioning the dough mass to be packaged between two thinly formed sheets of flexible material of which at least one sheet is transparent, compacting the sheets together and closely about the dough mass, securing the sheets together in an outwardly spaced relation to the dough mass to form a substantially circular closed receptacle about the dough mass and with the diameter of the receptacle being significantly larger than the diameter of the dough mass and into which extends at least one air venting port sufficiently small as to allow the passage of air into and from the receptable without allowing the viscus dough material extruding excessively from the receptacle through the port during a normal dough rolling operation and during such time as relatively high pressures are applied to the dough within the receptacle, compacting the receptacle and dough mass within a closely fitting container.

30. The method of packaging a prepared dough mass as set forth in claim 29 that includes the step of forming at least one air venting port that extends into the said receptacle.

31. The method of packaging a prepared dough mass as set forth in claim 29 including the step of forming through both sheets of the receptacle in close inner adjacency to the secured together surfaces of the receptacle, a plurality of closely spaced punctures.

32. The method of packaging a prepared dough mass as set forth in claim 31 including the further step of inclosing the sealed container within another closely fitting container.

33. The method of packaging a prepared dough mass as set forth in claim 29 including the step of sealing closed the said closely fitting container.

34. The method of packaging a prepared dough mass that is to be subsequently rolled within the package into pastry form including the steps of securing thinly formed sheets of flexible transparent material together to define by the secured together surfaces of the sheets a wafer-like receptacle having therein a dough admitting slot, extending through the sheets of the receptacle adjacent the secured together surfaces of said sheets a plurality of air venting ports, depositing within the receptacle by way of said dough admitting slot and in inwardly spaced relation to said secured together surfaces the dough mass to be packaged, sealing closed said dough admitting slot, removing substantially all air from within the receptacle to bring the inner surfaces of the sheets of the receptacle together and closely about the dough mass, compact the assembly and inclose within a closely fitting container.

35. The method of packaging a prepared dough mass as set forth in claim 34 wherein the step of securing together the sheets of the receptacle and the step of forming through the sheets of the receptacle the said plurality of air venting ports, are effected substantially contemporaneously.

36. The method of packaging a prepared dough mass as set forth in claim 34 wherein the step of securing together the sheets of the receptacle is effected after the step of forming within the sheets the plurality of air venting ports.

37. The method of packaging a prepared dough mass as set forth in claim 34 which further includes the step of sealing closed the closely fitting container.

38. The method of packaging a prepared dough mass as set forth in claim 37 which further includes the step of inclosing the sealed container within a second inclosure.

39. The method of packaging a prepared dough mass that is to be subsequently rolled within its package into crust form including the steps of securing together thinly formed sheets of transparent material into a substantially circular configurated wafer-like receptacle, extending through a sheet of the receptacle a dough admitting slot, extending through the receptacle in close adjacency to the secured edge of the receptacle a plurality of closely spaced ports, depositing within the receptacle by way of said slot the dough mass to be packaged with the dough mass being significantly smaller in configuration than the receptacle, sealing closed the dough admitting slot, removing substantially all the air from within the receptacle and inclosing the assembly within a closable container.

40. The method of packaging a prepared dough mass as set forth in claim 39 wherein the step of securing together the sheets of the receptacle and the step of forming therein the closely spaced parts are effected substantially contemporaneously.

41. The method of packaging a prepared dough mass as set forth in claim 39 which further includes formed through the sheets of the receptacle other air venting ports.

42. The method of packaging a prepared dough mass as set forth in claim 39 which further includes the step of sealing closed the closable container inclosing the dough mass and receptacle therefor.

43. The method of packaging a prepared dough mass as set forth in claim 42 which further includes the step of inclosing the sealed container within a closable container.

44. The method of packaging a prepared dough mass that is subsequently to be reshaped by rolling in its packaging receptacle into crust form including, the steps of depositing the dough mass to be packaged between two thinly formed sheets of flexible material of which at least one sheet is transparent and at least one sheet includes a plurality of air venting ports sufficiently small as to allow the passage of air into and from the receptacle without allowing the viscus dough material extruding excessively from the receptacle through these ports during a normal dough rolling operation and during such time as relatively high pressures are applied to the dough within the receptacle, forming a substantially circular seal securing the sheets together to form a substantially circular receptacle about the dough mass with the sides of the receptacle being substantially the same size and configuration and with the diameter of the receptacle being significantly larger in diameter than the dough mass, removing substantially all the air from within the receptacle to bring the inner surfaces of the receptacle together and closely about the dough mass, inclosing the assembly within a closely fitting container.

45. The method of packaging a prepared dough mass as set forth in claim 44 which further includes the step of sealing closed the said closely fitting container.

46. The method of packaging a prepared dough mass as in claim 44 which further includes the step of inclosing the said sealed container within a closely fitting container.

47. A method of packaging a prepared dough mass as set forth in claim 44 wherein the said air venting ports within at least one sheet of the material forming the receptacle, are formed in the sheet substantially contemporaneously with the sealing of the sheets together to form the receptacle.

48. The method of packaging a prepared dough mass as set forth in claim 44 includes the step of extending through both sheets of the receptacle in close inner adjacency to the said seal a plurality of air venting ports.

49. The method of packaging a prepared dough mass as set forth in claim 48 wherein the step of forming through both sheets of the receptacle in close inner adjacency to the said seal a plurality of air venting ports are effected prior to the sealing operation.

50. The method of packaging prepared dough that is to be subsequently to be reshaped by rolling within its package into the configuration of the package including the steps of compacting the prepared dough into a wafer-like mass, depositing said wafer-like dough mass between two thinly formed sheets of flexible material of which at least one sheet is transparent, securing the sheets together to form a substantially circular receptacle about the dough mass of significantly larger diameter than the dough mass and into which extends at least one air venting port sufficiently small as to allow the passage of air into and from the receptacle without allowing the viscus dough material extruding excessively from the receptacle through the port during a normal dough rolling operation and during such time as relatively high pressures are applied to the dough within the receptacle, and with the sheets forming the sides of the receptacle being of substantially the same size and configuration, removing substantially all the air from within the receptacle to bring the inner surfaces of the receptacle together and closely about the dough mass, inclosing the dough mass and receptacle within a closely fitting container.

51. The method of packaging a prepared dough mass as set forth in claim 50 including the further step of forming a plurality of air venting ports through both sheets of the receptacle in close internal adjacency to the secured edge of the receptacle for tearing free the secured edge of the receptacle to open the receptacle.

52. The method of packaging a prepared dough mass as set forth in claim 51 wherein the plurality of air venting ports are formed through the sheets of the receptacle substantially contemporaneously with securing of the sheets of the receptacle together.

53. The method of packaging a prepared dough mass as set forth in claim 50 which further includes the step of sealing close the closely fitting container.

54. The method of packaging prepared dough as in claim 53 which further includes the step of inclosing the said sealed container within a closely fitting container.

55. The method for packaging a prepared dough mass that is to be subsequently reshaped by rolling within its package into crust form including the steps of depositing the dough mass between two thinly formed sheets of transparent material, extending the sheets outwardly from the dough mass and securing the sheets together in spaced relation to said dough mass to form a substantially circular receptacle inclosing the dough mass and into which extends at least one air venting port sufficiently small as to allow the passage of air into and from the receptacle without allowing the viscus dough material extruding excessively from the receptacle through the port during a normal dough rolling operation and during such time as relatively high pressures are applied to the dough within the receptacle, removing substantially all air from within the receptacle to bring the inner surfaces of the receptacle together and closely about the surface of the dough mass, compacting the assembly within an inclosing receptacle.

* * * * *